United States Patent [19]
Horning et al.

[11] Patent Number: 5,285,322
[45] Date of Patent: Feb. 8, 1994

[54] MECHANISMS FOR MOUNTING CAM BARRELS

[75] Inventors: Randy E. Horning; Peter A. Newman, both of Rochester; James C. Crosley, Spencerport, all of N.Y.

[73] Assignee: Eastman Kodak Company, Rochester, N.Y.

[21] Appl. No.: 941,821

[22] Filed: Sep. 8, 1992

[51] Int. Cl.⁵ .............................................. G02B 7/04
[52] U.S. Cl. .................... 359/826; 359/700; 359/703; 359/704; 354/286
[58] Field of Search ............... 359/694, 699, 700, 702, 359/703, 704, 819, 827, 823, 825, 826; 354/286

[56] References Cited
U.S. PATENT DOCUMENTS

| | | | |
|---|---|---|---|
| 3,441,339 | 4/1969 | Rederer et al. | 359/822 |
| 4,307,951 | 12/1981 | Saito et al. | 359/683 |
| 4,946,255 | 8/1990 | Mizoguchi et al. | 359/827 |

FOREIGN PATENT DOCUMENTS

| | | | |
|---|---|---|---|
| 0275404 | 11/1990 | Japan | 359/694 |
| 0083004 | 4/1991 | Japan | 359/700 |
| 0060624 | 2/1992 | Japan | 359/827 |

*Primary Examiner*—Richard A. Bertsch
*Assistant Examiner*—Christopher Verdier
*Attorney, Agent, or Firm*—Millen, White, Zelano & Branigan

[57] ABSTRACT

A zoom lens includes a lens group mounted in a cam barrel mechanism which includes a fixed barrel with a cam barrel rotationally mounted thereon. The lens group has a pin which projects through an axially extending clearance slot in the fixed barrel and a compliant feature on the pin removes the clearance between the pin and the slanted cam slot in the cam barrel so that as the cam barrel is rotated the lens group translates axially within the fixed barrel. The fixed barrel has an endcap with array of centering orifices mounted thereon and a beveled surface which is engaged by an outboard edge of the cam barrel. The cam barrel is urged against the endcap by a wave washer disposed between the cam barrel and a base. Radially disposed with respect to the cam barrel are a pair of spaced lugs and a bowed sheet spring which engages the cam barrel to urge the cam barrel against the lugs. The wave washer and bowed sheet spring positively locate the cam barrel with zero clearance. As long as the spring forces of the wave washer and bowed sheet spring are not exceeded, the cam barrel is limited only to rotational motion with respect to the fixed barrel.

19 Claims, 4 Drawing Sheets

MECHANISMS FOR MOUNTING CAM BARRELS

BACKGROUND OF THE INVENTION

1. Field of the Invention

The present invention relates to mechanisms for mounting cam barrels, and more particularly to mechanisms for mounting cam barrels which are used to translate lenses in optical devices such as cameras and the like.

2. Background Art

Camera zoom lenses typically comprise a lens subgroup, or subgroups, mounted within a lens barrel for axial displacement during a zooming operation. A lens subgroup may comprise several lens elements mounted on a lens element mount. Cam barrels are frequently used as mechanisms for zooming lens subgroups. In accordance with current state-of-the-art practices, cam barrels are mounted on a fixed barrel with very tight tolerances between the inside diameter of the cam barrel and the outside diameter of the fixed barrel. By having the cam barrel and fixed barrel interface with minimal clearance, tilt control is provided to ensure that the motion of the cam barrel is purely rotational. In order to prevent the cam barrel from translating axially, a circumferential slot is usually formed in the cam barrel through which a pin of a tightly toleranced diameter extends from the fixed barrel. The pin provides a minimum clearance constraint with the straight slot in the cam barrel.

The tight tolerances at the cam barrel and the fixed barrel interface and the tight tolerances of the pin with respect to the cam barrel slot add considerable cost to the mechanism. Moreover, even when tight tolerances are maintained, there must necessarily be some clearance between the mating parts so that the barrels may move with respect to one another. This clearance results in a variability in the position of the lens group as dictated by the position of the cam slot.

Prior art approaches exemplified by U.S. Pat. Nos. 3,441,339; 4,307,951 and 5,052,782, incorporated herein by reference, are concerned with mounting lenses, such as zooming lenses, but do not suggest what is essentially a zero-clearance mounting configuration which would solve the problems of expense and misalignment associated with the current approach in which cam barrels are mounted on fixed barrels with minimal clearance.

SUMMARY OF THE INVENTION

In view of the aforementioned considerations, it is an object of the instant invention to provide a new and improved mechanism for mounting cam barrels, wherein the expense and difficulties associated with tight tolerances between cam barrels and fixed barrels are substantially eliminated.

Upon further study of the specification and appended claims, further objects and advantages of this invention will become apparent to those skilled in the art.

In view of this object and other objects, the instant invention contemplates a cam barrel mechanism having a fixed barrel with a rotatable cam barrel coaxially mounted thereon, wherein the cam barrel has an inner diameter substantially greater than the outer diameter of the fixed barrel and a length shorter than the fixed barrel. An axial stop is fixed proximate one end of the fixed barrel for axially engaging one end of the cam barrel and radial stops are positioned opposite the other end of the fixed barrel in spaced relation thereto for radially engaging the cam barrel proximate the other end of the cam barrel. The cam barrel is held in abutment with the stops by spring forces. A lens group is mounted in the fixed barrel for axial translation therein when the cam barrel is rotated with respect to the fixed barrel to axially move a pin projecting from the lens group through a straight slot in one barrel and a cam slot in the other barrel.

Since the outside diameter of the fixed barrel and inside diameter of the cam barrel are not approximately the same with close to zero-clearance, the barrels do not have to be machined to exact tolerances resulting in a less expensive cam mechanism. Since the cam barrel is urged into abutment with the axial and radial stops actual zero-clearance is provided which zero-clearance minimizes variability.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 5 is an enlarged top view showing a spacer positioning a pin in a slot;

DETAILED DESCRIPTION

Figure 1:
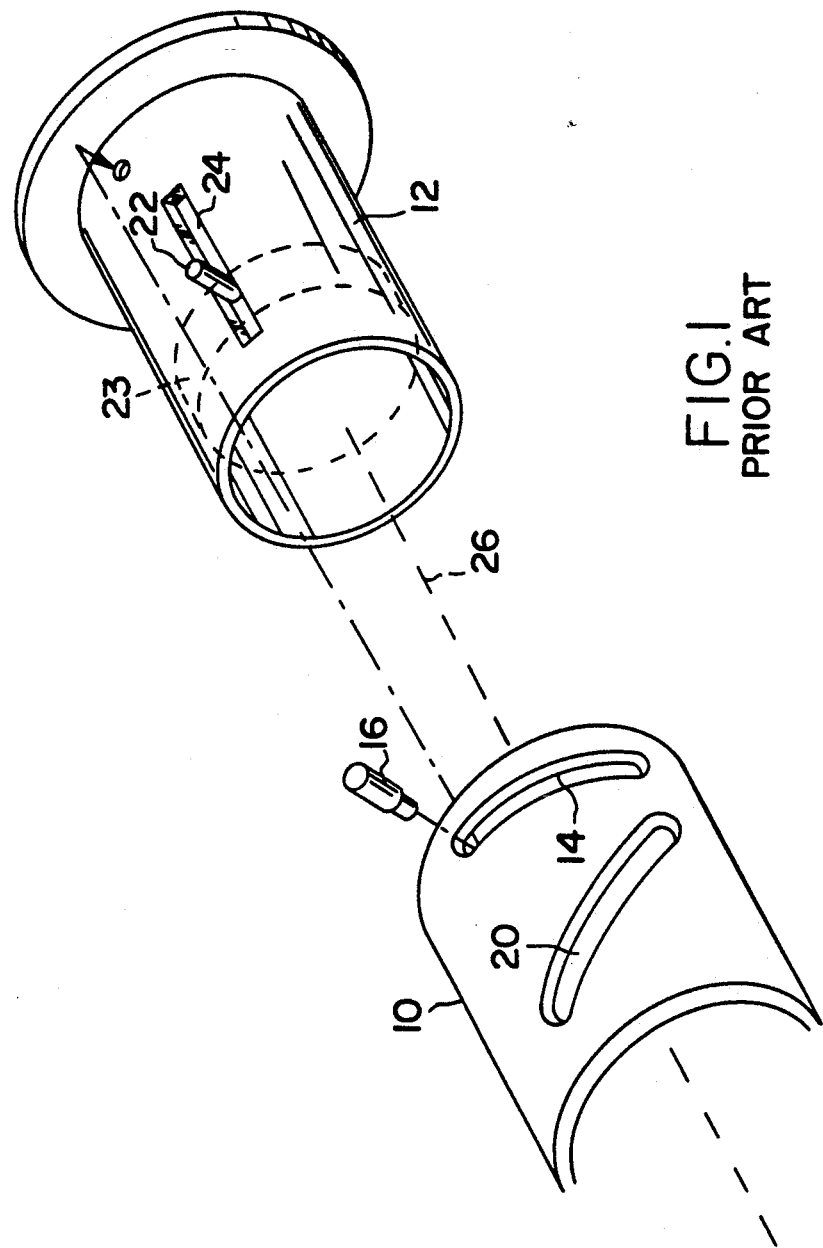
FIG. 1 is an exploded view, in perspective, of a prior art approach to mounting a cam barrel on a fixed barrel.

Referring now to FIG. 1, there is shown a prior art approach to mounting cam barrels on fixed barrels in which a cam barrel 10 is rotatably mounted on fixed barrel 12 with very close tolerances. The cam barrel 10 has a circumferential slot 14 therein which receives a pin 16 which is fixed in a threaded hole or the like of fixed barrel 12 to limit the cam barrel to only rotational motion with respect to the fixed barrel. The cam barrel also includes a slanted cam slot 20 which receives a pin 22 secured to a lens group 13 within the fixed barrel 12. The pin 22 is also in registration with a longitudinal slot 24 in the fixed barrel 12 so that as the cam barrel 10 rotates on the fixed barrel, the pin 22 moves parallel to the axes 26 of the barrels. As has been previously pointed out, it is necessary that slots 14, 20 and 24 have very tight tolerances with respect to the pins 16 and 22 and that there is minimal clearance in the interface between the inner surface of the cam barrel 10 and the outer surface of the fixed barrel 12. Even with high tolerances, there is variability in the positioning of the lens group. Moreover, maintaining high tolerances considerably increases the expense of prior art zooming lens mechanisms of the type exemplified by FIG. 1.

Figure 2:
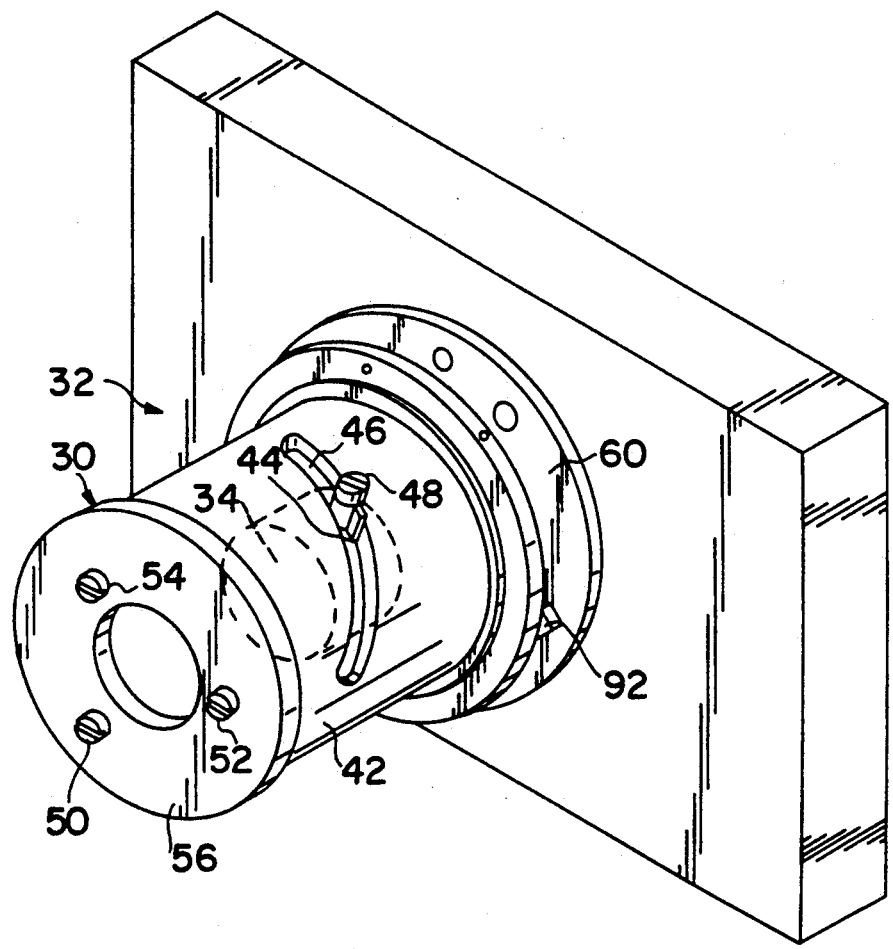
FIG. 2 is a perspective view of a cam barrel mounted on a fixed barrel in accordance with the principles of the present invention.
Figure 3:
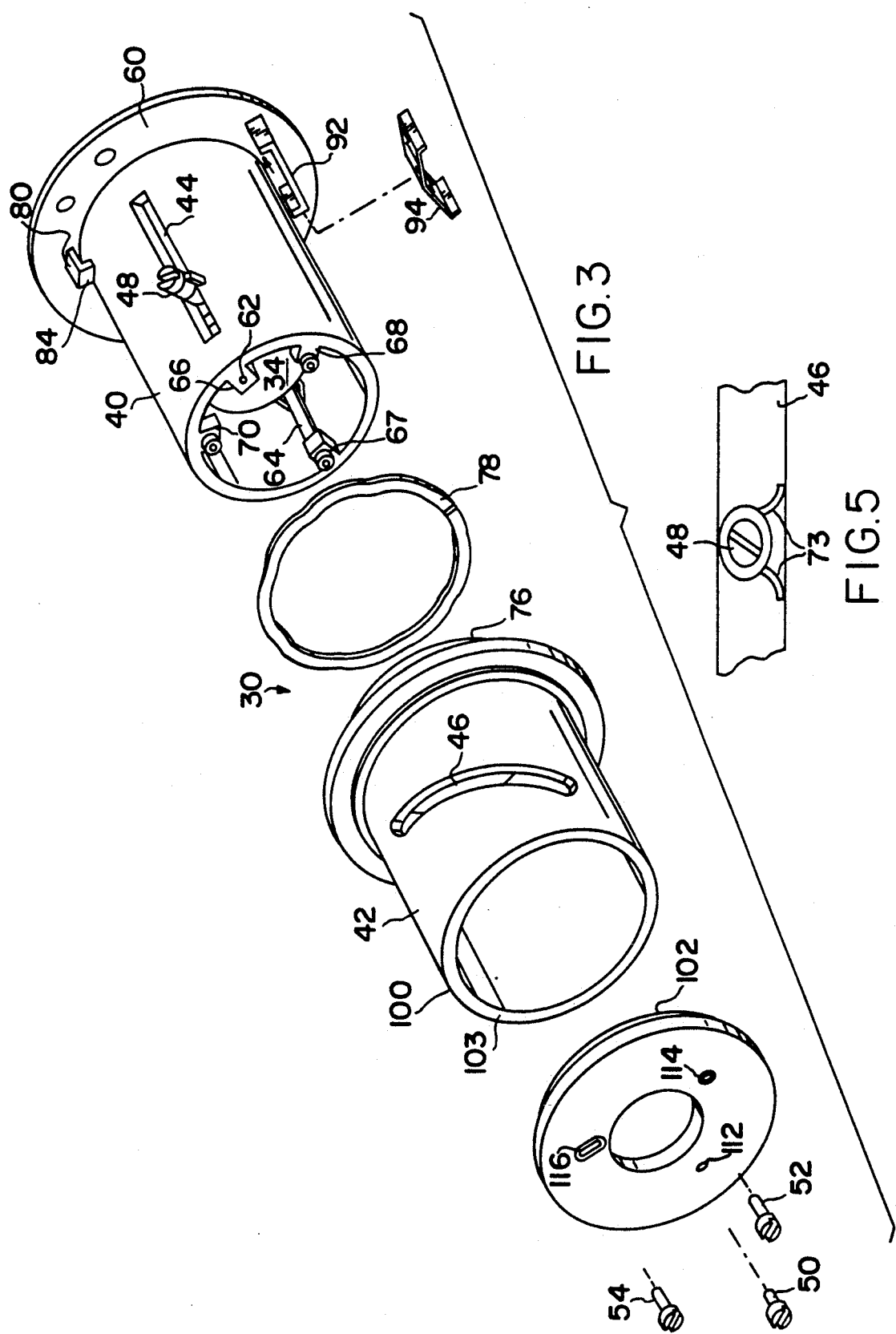
FIG. 3 is an exploded view, in perspective, of the mechanism of the present invention.
Figure 4:
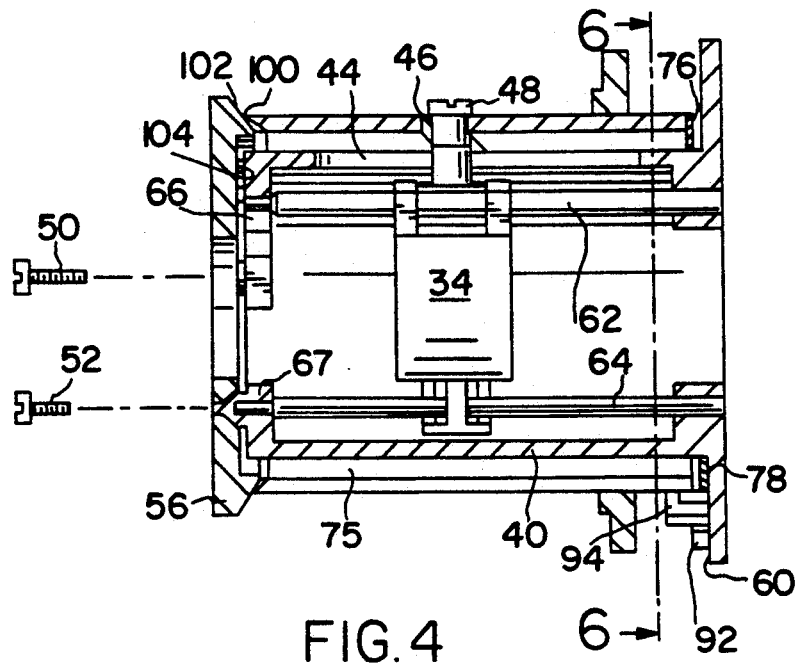
FIG. 4 is a side elevation of a cam barrel mechanism configured in accordance with principles of the present invention.

Referring now to FIGS 2, 3 and 4, there is shown a cam barrel mechanism in accordance with the instant invention, designated generally by the numeral 30, mounted on a camera 32 for focusing images on a recording medium (not shown) within the camera. The cam barrel mechanism 30 contains therewithin a zoom lens group 34 and includes a first barrel which is a fixed barrel 40 rigidly attached to the housing of the camera 32 and a second barrel which is a rotatable cam barrel 42 coaxially mounted on the fixed barrel. The fixed barrel 40 has a longitudinally extending clearance slot 44 therein while the rotatable cam barrel 42 has a slanted cam slot 46 therein. Registered with the cam slot 46 is a pin 48 which is fixed to the lens group 34. Disposed outboard of the rotatable cam barrel 42 and fixed by screws 50, 52 and 54 to the fixed barrel 40 is an endcap 56 which, as will be explained further hereinafter, cooperates to support the cam barrel in a spring loaded, zero-clearance condition. When the cam barrel 42 is rotated counterclockwise, the lens group 34 moves away from the recording medium (not shown) within the camera 32 and when the cam barrel rotated clockwise moves toward the recording medium.

The fixed barrel 40 is fixed to a base plate 60 which is in turn fixed to or is part of the body of the camera 32 (See FIG. 2). The lens group 34 is mounted within the fixed barrel 40 to slide axially on two rods 62 and 64 which are anchored at first ends thereof to ears 66 and 67, respectively, proximate the end of the fixed barrel 40. The ear 67 along with ears 68 and 70 project radially inwardly from the fixed barrel 40 to rigidly mount the annular endcap 56 so as to positively axially position the rotatable cam barrel 42 on the fixed barrel 40.

As seen in FIG. 4, the cam barrel 42 is coaxially mounted on the fixed barrel 40 with the pin 48 projecting from the lens group 34 through the longitudinal clearance slot 44 of the fixed barrel and through the cam slot 46. As is seen in FIG. 5, a compliant spacer 73 biases the pin 48 against one side of the slot 46 with zero clearance. As is apparent from FIG. 4, the cam barrel 42 has an inner diameter substantially larger than the outer diameter of the fixed barrel 40 resulting in an annular gap 75 between the barrels. Positioned between an inboard end 76 of the cam barrel 42 and the base plate 60 of the fixed barrel 40 is a resilient wave washer 78 which holds the inboard end of the cam barrel in spaced relation with respect to the base plate.

Figure 6:
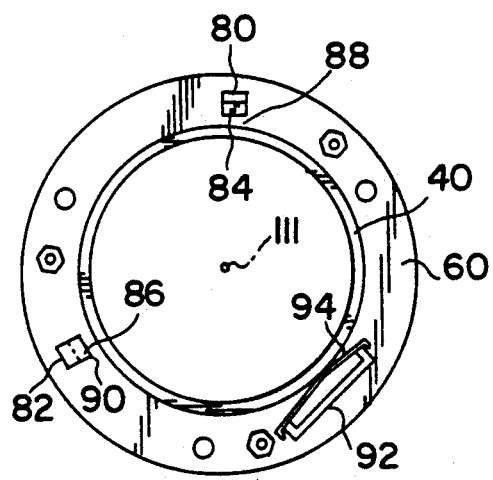
FIG. 6 is an elevational view taken along the lines 6—6 of FIG. 4.

As is best seen in FIGS. 3 and 6, projecting from the base 60 and disposed about the periphery of the fixed barrel 40 are first and second lugs 80 and 82, respectively spaced apart, ideally at 120°. The first lug 80 has inward projecting lip 84 projecting toward the fixed barrel 40 while the second lug 82 has an inwardly projecting lip 86 projecting toward the fixed barrel. There is a clearance 88 between lip 84 and fixed barrel 40 and a clearance 90 between the lip 86 and the fixed barrel, the clearances 88 and 90 being equal. Disposed at a position 120° from both the lug 80 and lug 82 is a spring holder 92 in which a bowed sheet spring 94 is retained. The sheet spring 94 is bowed toward the fixed barrel 40. As is seen in FIG. 4, cam barrel 42 is positioned in spaces 88 and 90 between the lips 84 and 86 of the first and second lugs 80 and 82 and is engaged by the bowed sheet spring 94 so as to be urged against the lips 84 and 8 of the lugs. The bowed sheet spring 94 urges the cam barrel 42 against the lips 84 and 86 allowing only rotational motion of the cam barrel in the absence of exerting a force sufficient to overcome the bias of the bowed sheet spring. In essence, the bowed sheet spring 94 positions the cam barrel 42 in a zero-clearance condition. This is accomplished without relying on tight tolerances which results in considerable cost savings over the prior art approach of FIG. 1.

As is seen in FIG. 4, the wave washer 78 positions the cam barrel 42 axially with respect to the fixed barrel 40 by urging an outboard end 100 of the cam barrel against a bevelled surface 102 of the annular endcap 56 which extends from a flat inner surface 104 thereof. The outboard end 100 of the cam barrel 42 is bevelled, ideally at an angle not equal to the bevelled surface 102. This results in line contact between the outboard end of the cam barrel and the bevelled surface 102 of the endcap 56, whereby the bevels exactly locate the center of the bevelled end of cam barrel 42 to the center of endcap 56. While a concave bevelled surface 102 is shown, the surface 102 could also be of other configurations. For example, the surface 102 could be curved or convex or could be defined by convex and concave surfaces which meet to define an annular edge providing line contact.

Figure 7:
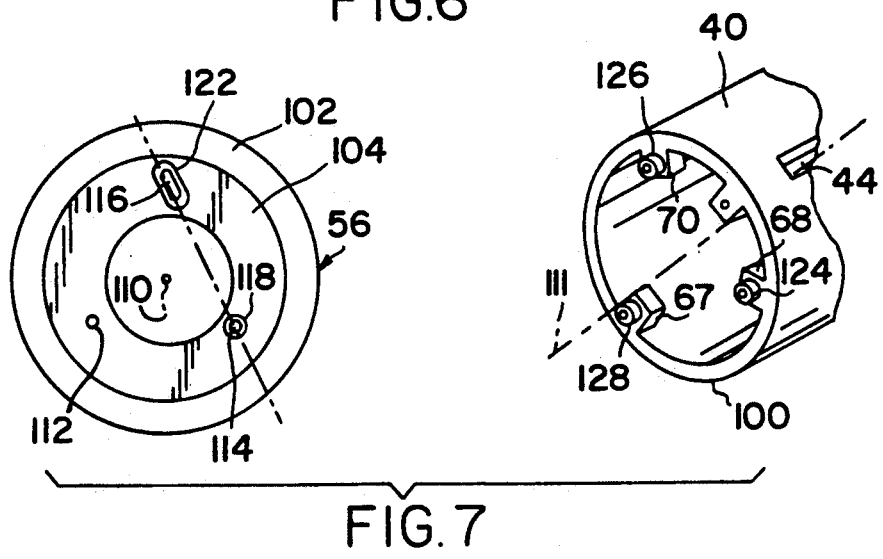
FIG. 7 is an exploded view, partially in perspective and partially planar, showing how an endcap is connected to a fixed barrel or on which the cam barrel is mounted.

Referring now to FIG. 7, there is disclosed structure for mounting endcap 56 to the fixed barrel 40 so that the center 110 of the endcap is in substantially exact alignment with the axis 111 of the fixed barrel. This is accomplished by forming in the endcap 56 three orifices comprising a straight cylindrical bore 112 with a diameter substantially larger than screw 52, (See FIGS. 2, 3 and 4), a conical bore 114 and a bevelled slot 116. The conical bore 114 has a conical surface 118 which is concave with respect to the inner surface 104 of the endcap 56 while the bevelled slot 116 has a bevelled surface 122 which is also concave with respect to the inner surface of the endcap.

Aligned with the cylindrical bore 112, conical bore 114 and bevelled bore 116 are lugs 124, 128 and 126, respectively, projecting from the inwardly projecting ears 68, 70 and 67, respectively, of the fixed barrel 40. The lug 124 which aligns with the cylindrical bore 112 is shorter than the lugs 128 and 126 which register with the conical bore 114 and bevelled slot 116, respectively. This is because the lug 124 abuts the flat surface 104 proximate the cylindrical bore 112, whereas the lug 126 is received within the bevelled slot 116 abutting the conical surface 122 and the lug 128 is received in the conical bore provided by the bevelled surface 118. The screws 50, 54 and 52, respectively, are received within threaded bores in the lugs 128, 126 and 124, respectively. When the screws are tightened down in this order, the endcap 56 automatically centers.

Since the wave spring 78 urges the outboard end 100 of the barrel 42 against the bevelled surface 102 of the endcap 56, axial movement of the cam barrel 42 with respect to fixed barrel 40 is precluded so long as the applied axial force is less than the force exerted by the wave spring. Accordingly, the cam barrel 42 is positively located axially on the fixed barrel 40 with zero clearance and with only rotational motion possible. The bowed sheet spring 94 urges the cam barrel 42 radially against the inwardly projecting lips 84 and 86 on the first and second lugs 80 and 82, positively positioning the cam barrel on the fixed barrel 40 with zero clearance and with only rotational motion possible.

Thus, the bowed sheet spring 94 and resilient wave washer 78 cooperate to urge the cam barrel against stop surfaces provided by bevelled surface 102 on the end cap 56 and the radially positioned lips 84 and 86 to provide zero clearance without the necessity of maintaining extremely tight tolerances in the cam barrel mechanism. Once the cam barrel 42 is positioned, there is no clearance necessary at the interfacing positions of the mechanism, minimizing variability in the cam barrel position and drastically reducing variability in the positioning of the lens group 34.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A cam barrel mechanism mounting a lens group for focusing an image in an optical device, the mechanism comprising:
    a base;
    a first barrel of a selected outer diameter and selected length having first and second ends, the first barrel being fixed proximate the first end to the base and having the lens group therein mounted for axial movement with respect thereto;
    a second barrel having first and second ends of a selected inner diameter substantially greater than said outer diameter of the first barrel, the second barrel being coaxially mounted on the first barrel;
    an axially extending zero-clearance slot in the first barrel, an oblique slot in the second barrel and a pin extending from the lens group and received in the oblique slot wherein the lens group axially translates with respect to the barrels when the second barrel is rotated with respect to the first barrel;
    axial stop means rigidly fixed to the first barrel for axially positioning the second barrel with respect to the first barrel;
    radial stop means positioned in spaced relation with respect to the first barrel at a precise radial distance from the axis of the first barrel for radially positioning the second barrel with respect to the first barrel;
    first spring means for urging the second barrel into abutment with the axial stop means; and
    second spring means for urging the second barrel into abutment with the radial stop means.

2. The cam barrel mechanism of claim 1 further including resilient means disposed between the pin and the oblique slot to bias the pin against a side of the slot with zero clearance.

3. The cam barrel mechanism of claim 1, wherein the radial and axial stop means are positioned proximate opposite ends of the first barrel.

4. The cam barrel mechanism of claim 3, wherein the axial stop means is fixed to the second end of the first barrel and the radial stop means is fixed with respect to the first end of the first barrel and wherein the spring means comprises a first spring disposed between the first end of the second barrel and the base to urge the second end of the second barrel against the axial stop means and a second spring disposed proximate the first end of the second barrel to urge the second barrel against the radial stop means proximate the first end of the second barrel.

5. The cam barrel mechanism of claim 4, wherein the axial stop means is an endcap, the end cap including means for self-centering the endcap of the first barrel.

6. The cam barrel mechanism of claim 5, wherein the self-centering means includes first, second and third orifices in the endcap, the first orifice being a cylindrical bore, the second orifice being a conical bore and the third orifice being a bevelled slot, wherein each of the orifices is aligned with a projection extending in an axial direction from the first barrel and wherein means are provided for securing the endcap tightly against the projections with a projection received within the conical bore and bevelled slot and abutting the endcap proximate the cylindrical bore.

7. The cam barrel mechanism of claim 6, wherein the second barrel has a bevelled second end which defines an outboard end and wherein the endcap has a surface engaged by the second barrel which is bevelled as is the second end of the second barrel to center the second end of the second barrel with respect to the second end of the first barrel.

8. The cam barrel mechanism of claim 7, wherein there is annular line contact between the end cap and the second end of the second barrel.

9. The cam barrel mechanism of claim 6, wherein the securing means are screws received in threaded bores within the projections.

10. The cam barrel mechanism of claim 9, wherein the first spring is a circular wave washer and the second spring is a bowed sheet spring having a convex surface engaging the second barrel.

11. The cam barrel mechanism of claim 4, wherein the first spring is a circular wave washer and the second spring is a bowed sheet spring having a convex surface engaging the second barrel.

12. A cam barrel mechanism for mounting a lens group for focusing an image in an optical device, comprising:
    a cam barrel;
    a fixed barrel disposed within the cam barrel, the fixed barrel having the lens group mounted therein and having a longitudinal slot through which a projection from the lens group extends;
    means fixed with respect to the fixed barrel providing an axially facing surface against which the cam barrel is urged;
    means disposed radially of the fixed barrel and fixed with respect thereto providing a radially facing surface proximate the cam barrel;
    first means engaging the cam barrel for urging the cam barrel against the axially facing surfaces; and
    second means engaging the cam barrel for urging the cam barrel against the radially facing surface.

13. The cam barrel mechanism of claim 12, wherein the first and second means comprise, respectively:
    a first spring disposed between cam barrel and a base for mounting the fixed barrel, the first spring having a spring force applied axially with respect to the cam barrel; and
    a second spring disposed radially of the cam barrel, the second spring having a spring force applied radially toward the cam barrel.

14. The cam barrel mechanism of claim 13, wherein the first and second springs are disposed proximate the base.

15. The cam barrel mechanism of claim 14, wherein the means providing an axially facing surface is an endcap mounted on the fixed barrel, the endcap including means for self-centering the endcap on the fixed barrel.

16. The cam barrel mechanism of claim 15, wherein the self-centering means includes first, second and third orifices in the endcap wherein the first orifice is a cylindrical bore, the second orifice is a conical bore and the third orifice is a bevelled slot, wherein each of the orifices is aligned with a projection extending in an axial direction from the first barrel and wherein means are provided for securing the endcap tightly against the first barrel with a projection received within the conical bore and bevelled slot and a projection abutting the endcap proximate the cylindrical bore.

17. The cam barrel mechanism of claim 16, wherein the cam barrel has a bevelled outboard end which defines an outboard edge and wherein the surface of the endcap engaged by the cam barrel is bevelled as is the second end of the second barrel to center the second end of the second barrel with respect to the second end of the first barrel.

18. The cam barrel of claim 17, wherein the securing means are screws received in threaded bores within the threaded caps.

19. The cam barrel mechanism of claim 14, wherein the first spring is a circular wave washer and the second spring is a bowed sheet spring having a convex surface engaging the cam barrel.

* * * * *